(12) United States Patent
Himes

(10) Patent No.: US 10,247,003 B2
(45) Date of Patent: Apr. 2, 2019

(54) BALANCED ROTATING COMPONENT FOR A GAS POWERED ENGINE

(71) Applicant: United Technologies Corporation, Hartford, CT (US)

(72) Inventor: Jason D. Himes, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 428 days.

(21) Appl. No.: 15/023,877

(22) PCT Filed: Sep. 25, 2014

(86) PCT No.: PCT/US2014/057456
§ 371 (c)(1),
(2) Date: Mar. 22, 2016

(87) PCT Pub. No.: WO2015/088623
PCT Pub. Date: Jun. 18, 2015

(65) Prior Publication Data
US 2016/0237825 A1    Aug. 18, 2016

Related U.S. Application Data

(60) Provisional application No. 61/882,691, filed on Sep. 26, 2013.

(51) Int. Cl.
*F01D 5/10* (2006.01)
*F01D 5/02* (2006.01)
(Continued)

(52) U.S. Cl.
CPC ........... *F01D 5/027* (2013.01); *F01D 5/3015* (2013.01); *F01D 25/06* (2013.01); *F02C 3/04* (2013.01);
(Continued)

(58) Field of Classification Search
CPC ........ F01D 5/027; F01D 5/3015; F01D 25/06; F01D 5/10; F01D 5/26; F01D 25/04;
(Continued)

(56) References Cited

U.S. PATENT DOCUMENTS 1,502,903 A * 7/1924 Campbell ............. F01D 21/003
  415/119
3,965,382 A * 6/1976 McCrosky ............. F16F 15/32
  310/51
(Continued)

FOREIGN PATENT DOCUMENTS

DE   102004037608   3/2006
GB      2119063    11/1983

OTHER PUBLICATIONS

International Preliminary Report on Patenability for Application No. PCT/US2014/057456 dated Apr. 7, 2016.
(Continued)

*Primary Examiner* — Jason D Shanske
*Assistant Examiner* — Brian Christopher Delrue
(74) *Attorney, Agent, or Firm* — Carlson, Gaskey & Olds, P.C.

(57) ABSTRACT

A rotating component for a turbine engine includes a rotor portion protruding radially outward, at least one overweight region is located in the rotor portion, and at least one additively manufactured counterweight region is positioned relative to the at least one overweight region such that the rotating component is circumferentially balanced.

17 Claims, 5 Drawing Sheets

(51) Int. Cl.
*F01D 25/06* (2006.01)
*F01D 5/30* (2006.01)
*F04D 29/66* (2006.01)
*F02C 3/04* (2006.01)
*F02C 7/06* (2006.01)
*F02C 7/36* (2006.01)

(52) U.S. Cl.
CPC ............... *F02C 7/06* (2013.01); *F02C 7/36* (2013.01); *F04D 29/662* (2013.01); *F05D 2220/32* (2013.01); *F05D 2230/31* (2013.01); *Y02T 50/671* (2013.01)

(58) Field of Classification Search
CPC ...... F02C 3/04; F02C 7/06; F02C 7/36; F04D 29/662; F05D 2220/32; F05D 2230/31; F05D 2260/15; F05D 2260/34; F05D 2260/96; Y02T 50/671; F16F 15/32; F05B 2260/96
USPC .................... 415/119; 416/144, 145
See application file for complete search history.

(56) References Cited

U.S. PATENT DOCUMENTS

| | | | |
|---|---|---|---|
| 4,294,135 A | 10/1981 | Tameo | |
| 4,304,523 A * | 12/1981 | Corsmeier | F01D 5/3015 29/889.21 |
| 4,648,799 A * | 3/1987 | Brown | F01D 5/3015 416/220 R |
| 4,784,012 A * | 11/1988 | Marra | F01D 5/027 415/119 |
| 4,835,827 A | 1/1989 | Marra | |
| 4,848,182 A * | 7/1989 | Novotny | F01D 5/027 416/144 |
| 4,879,792 A * | 11/1989 | O'Connor | F01D 5/027 29/889 |
| 4,890,981 A * | 1/1990 | Corsmeier | F01D 5/3015 416/220 R |
| 5,018,943 A * | 5/1991 | Corsmeier | F01D 5/027 416/144 |
| 5,167,167 A * | 12/1992 | Tiernan, Jr. | F16F 15/32 29/894 |
| 5,256,035 A * | 10/1993 | Norris | F01D 5/3015 416/220 R |
| 6,354,780 B1 | 3/2002 | Davis et al. | |
| 6,582,077 B1 | 6/2003 | Tabb et al. | |
| 6,588,298 B2 * | 7/2003 | Czerniak | F01D 5/027 416/145 |
| 6,951,448 B2 * | 10/2005 | Duesler | F01D 5/323 416/220 R |
| 7,069,654 B2 * | 7/2006 | Robbins | F01D 5/027 29/406 |
| 7,296,976 B2 * | 11/2007 | Roever | F01D 5/027 416/144 |
| 7,553,125 B2 | 6/2009 | Audic et al. | |
| 7,780,419 B1 * | 8/2010 | Matheny | F01D 5/005 416/221 |
| 8,122,785 B2 * | 2/2012 | Czerniak | F01D 5/027 73/470 |
| 8,303,255 B2 * | 11/2012 | Ramlogan | G01M 1/36 416/144 |
| 8,342,804 B2 | 1/2013 | Pronovost et al. | |
| 8,348,616 B2 * | 1/2013 | Williams | F01D 5/027 416/119 |
| 8,506,253 B2 * | 8/2013 | Lecuyer | F01D 5/027 416/145 |
| 8,579,538 B2 * | 11/2013 | Juh | F01D 5/066 403/359.5 |
| 8,888,458 B2 * | 11/2014 | Billings | F01D 5/027 416/144 |
| 9,297,258 B2 * | 3/2016 | Woods | F01D 5/027 |
| 9,957,799 B2 * | 5/2018 | Arnold | F01D 5/027 |
| 2003/0213334 A1 * | 11/2003 | Czerniak | F01D 5/027 416/145 |
| 2006/0083619 A1 | 4/2006 | Roever et al. | |
| 2009/0133494 A1 * | 5/2009 | Van Dam | G01M 1/36 73/460 |
| 2010/0080689 A1 | 4/2010 | Lee et al. | |
| 2010/0278634 A1 | 11/2010 | Koza et al. | |
| 2011/0099810 A1 * | 5/2011 | Stankowski | B22F 7/062 29/888 |
| 2011/0197703 A1 * | 8/2011 | Badre-Alam | B64C 11/008 74/574.1 |
| 2011/0311389 A1 * | 12/2011 | Ryan | B22F 3/1055 419/27 |
| 2012/0266439 A1 | 10/2012 | Geiger | |
| 2013/0108460 A1 * | 5/2013 | Szwedowicz | B22F 3/1055 416/241 R |
| 2013/0195673 A1 | 8/2013 | Godfrey et al. | |
| 2013/0216383 A1 * | 8/2013 | Brathwaite | F01D 5/027 416/144 |

OTHER PUBLICATIONS

Supplementary European Search Report for Application No. 14869635.4 dated Jul. 6, 2017.
International Search Report and Written Opinion for Application No. PCT/US2014/057456 dated Jun. 29, 2015.

* cited by examiner

BALANCED ROTATING COMPONENT FOR A GAS POWERED ENGINE

CROSS-REFERENCE TO RELATED APPLICATION

This application claims priority to U.S. Provisional Application No. 61/882,691 filed Sep. 26, 2013.

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

TECHNICAL FIELD

The present disclosure relates generally to rotating components in a turbine engine, and more specifically to a balanced rotating component for the same.

BACKGROUND OF THE INVENTION

Gas powered turbines, such as the gas powered turbine engines used to generate thrust for an aircraft, typically include a fan, compressor, combustor, and turbine arranged to generate thrust in a known manner. Within the compressor and the turbine are multiple rotating components such as compressor rotors and turbine rotors. Due to variances in the engine designs, the need to accommodate non-rotating components within the gas powered turbine engine, and manufacturing variances from engine to engine, stock rotating components are often not circumferentially balanced.

Circumferential imbalance in the rotating components introduces inefficiencies in the gas powered turbine and wear on the rotating component and/or the joint between the rotating component and the shaft in the gas powered turbine to which the rotating component is attached. The additional wear and stress resulting from the circumferential imbalance reduces the expected lifetime of the rotating component and potentially reduces the expected lifetime of the engine itself.

SUMMARY OF THE INVENTION

A rotating component for a turbine engine according to an exemplary embodiment of this disclosure, among other possible things includes a rotor portion protruding radially outward, at least one overweight region is located in the rotor portion, and at least one additively manufactured counterweight region positioned relative to the at least one overweight region such that the rotating component is circumferentially balanced.

A further embodiment of the foregoing rotating component includes a retaining ring for connecting a rotor coverplate to said rotating component, wherein the at least one additively manufactured counterweight region is a region of said retaining ring.

In a further embodiment of the foregoing rotating component, the counterweight region is a distinct component from the rotor portion and the retaining ring, and the at least one counterweight region is connected to the rotor portion and the retaining ring such that the counterweight region is static relative to the rotor portion.

In a further embodiment of the foregoing rotating component, the at least one counterweight region is integral to the retaining ring.

In a further embodiment of the foregoing rotating component, the retaining ring is entirely additively manufactured.

In a further embodiment of the foregoing rotating component, the additively manufactured counterweight region is a portion of and the retaining ring, is less than 100% of the retaining ring, and is additively manufactured after a remainder of the rotating component is manufactured.

In a further embodiment of the foregoing rotating component, the rotating component is characterized by a lack of a balance ring.

In a further embodiment of the foregoing rotating component, the additively manufactured counterweight region portion includes at least a first material and a second material, and the second material is denser than the first material.

In a further embodiment of the foregoing rotating component, a circumferential weight profile of the rotating component is at least partially determined by a ratio of the amount of the second material used to the remainder of the material used.

In a further embodiment of the foregoing rotating component, the part has a predetermined dimensional profile regardless of the circumferential weight profile of the rotating component.

A method for creating a rotating component for a turbine according to an exemplary embodiment of this disclosure, among other possible things includes manufacturing at least a first portion of the rotating component, testing the at least a first portion of the rotating component to determine any circumferential imbalance, and additively manufacturing at least second portion of the rotating component including a counterweight region in the second portion of the rotating component, thereby circumferentially balancing the rotating component.

In a further embodiment of the foregoing method, the step of additively manufacturing at least second portion of the rotating component including a counterweight region in the second portion of the rotating component, thereby circumferentially balancing the rotating component further includes additively manufacturing a second portion of the rotating component integral to the first portion of the rotating component.

In a further embodiment of the foregoing method, the second portion of the rotating component is fixedly attached to the first portion of the rotating component and is a distinct component from a remainder of the rotating component.

In a further embodiment of the foregoing method, the step of additively manufacturing at least second portion of the rotating component including a counterweight region in the second portion of the rotating component, thereby circumferentially balancing the rotating component, further includes additively manufacturing the counterweight region of the second portion at least partial is of a first material and additively manufacturing a remainder of the second portion from a second material, the first material being denser than the second material.

A further embodiment of the foregoing method, further includes the step of attaching the second portion of the rotating component to the first portion of the rotating component such that the second portion is maintained in a static position relative to the rotating component.

A gas turbine engine according to an exemplary embodiment of this disclosure, among other possible thing includes a compressor section, a combustor section fluidly connected to the compressor section, a turbine section fluidly connected to the combustor section, at least one rotating component having a retaining ring that at least partially comprises an additively manufactured portion, the part having a circumferential weight profile operable to counterbalance an unbalanced portion of the rotating component.

In a further embodiment of the foregoing gas turbine engine, the at least one rotating component is a rotor disposed in one of the compressor section and the turbine section.

In a further embodiment of the foregoing gas turbine engine, the at least one rotating component includes a plurality of additively manufactured portions.

In a further embodiment of the foregoing gas turbine engine, the additively manufactured portion of the part is a distinct component from a remainder of the retaining ring.

The foregoing features and elements may be combined in any combination without exclusivity, unless expressly indicated otherwise.

These and other features of the present invention can be best understood from the following specification and drawings, the following of which is a brief description.

DETAILED DESCRIPTION OF AN EMBODIMENT

Figure 1:
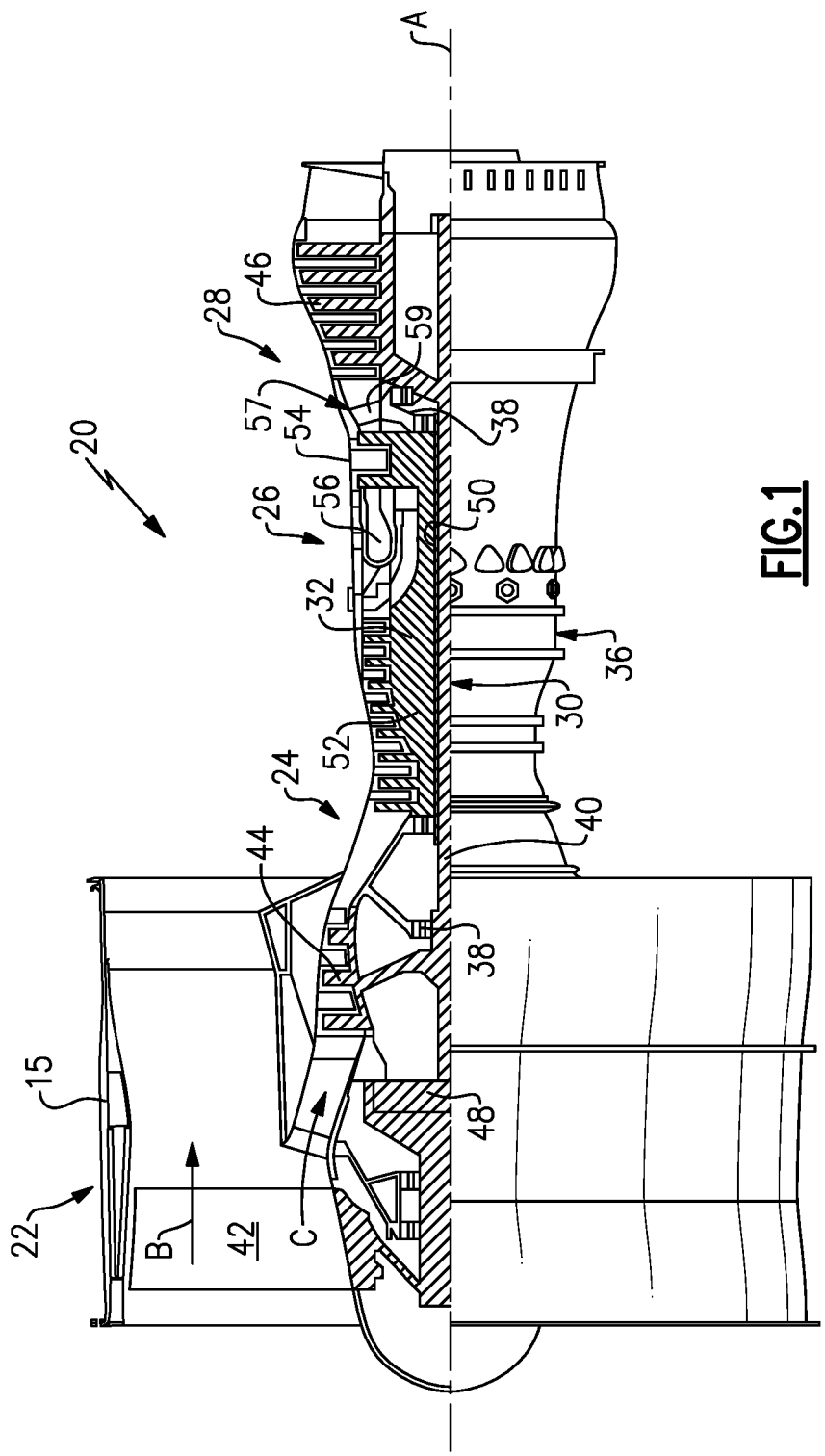
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 may be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second.

Figure 2:
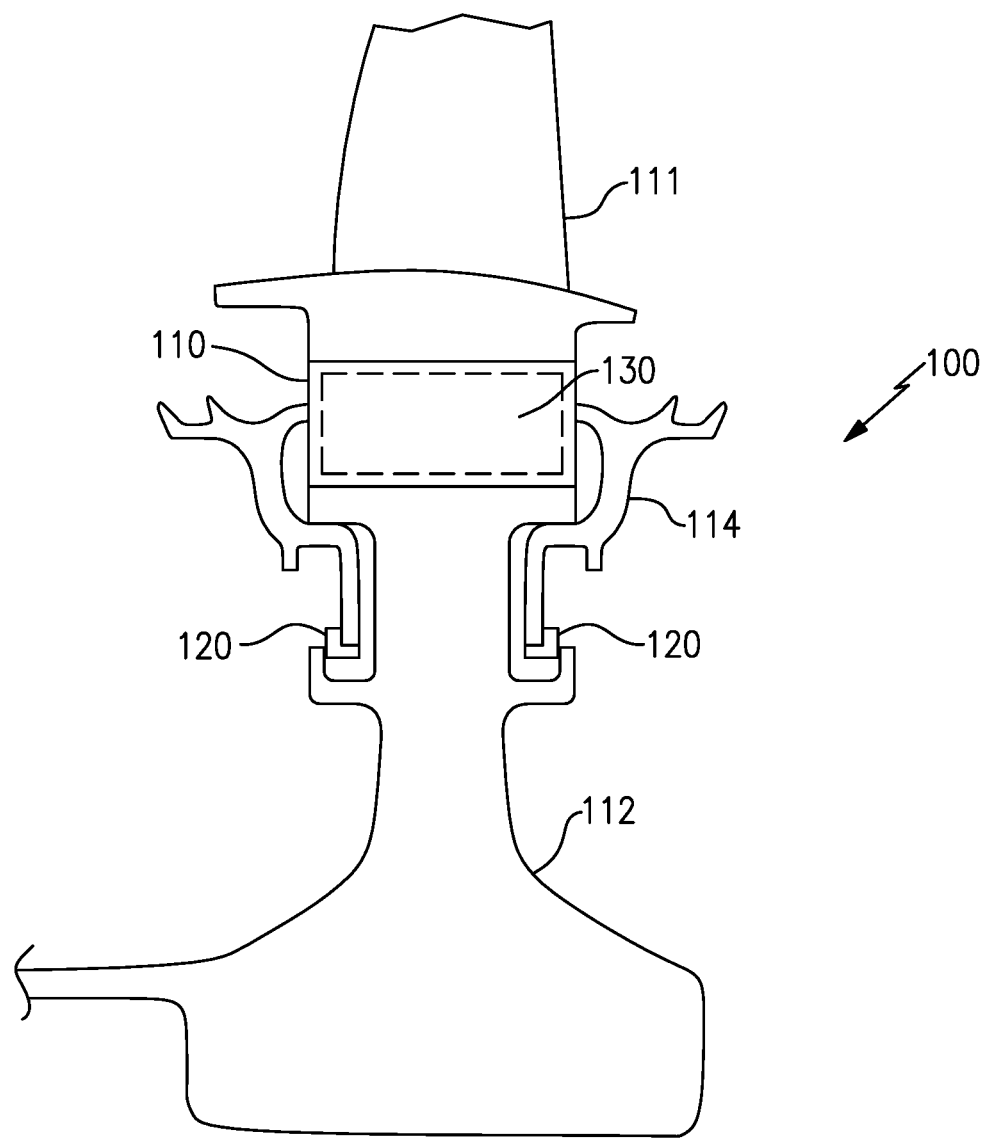
FIG. 2 schematically illustrates a cross section of a balanced rotating component including an additively manufactured portion.

FIG. 2 schematically illustrates a rotating component 100, such as a compressor rotor or a turbine rotor for use in the turbine engine 20 illustrated in FIG. 1. The rotating component 100 includes a radially outward protruding portion 110 to which rotor blades that protrude into the core flowpath C (illustrated in FIG. 1) can be mounted, the rotor blades interact with adjacent static components (referred to as stators) to generate compression (for a compressor rotor) or to drive a turbine shaft (for a turbine rotor) according to known gas powered turbine principles. The rotating component 100 is connected to a shaft 150 via a root portion. In one example, the shaft 150 is the low speed spool 30. In another example, the shaft 150 is the high speed spool 32.

Due to variances in engine designs and manufacturing tolerances many rotating components 100 have an uneven circumferential weight distribution. The uneven circumferential weight distribution results in an overweight region 130 that is effectively overweight relative to the remainder of the rotating component 100. As the rotating component 100 rotates within the gas turbine engine 20, the overweight region 130 throws off the balance of the rotating component 100 and causes engine vibrations. In order to balance the overweight region 130 and reduce the engine vibrations, a corresponding counterweight region 140 is constructed and offset from the overweight region 130. The counterweight region 140 is positioned to create a radial symmetry within the rotating component 100 and achieve an even circumferential weight distribution.

Figure 2A:
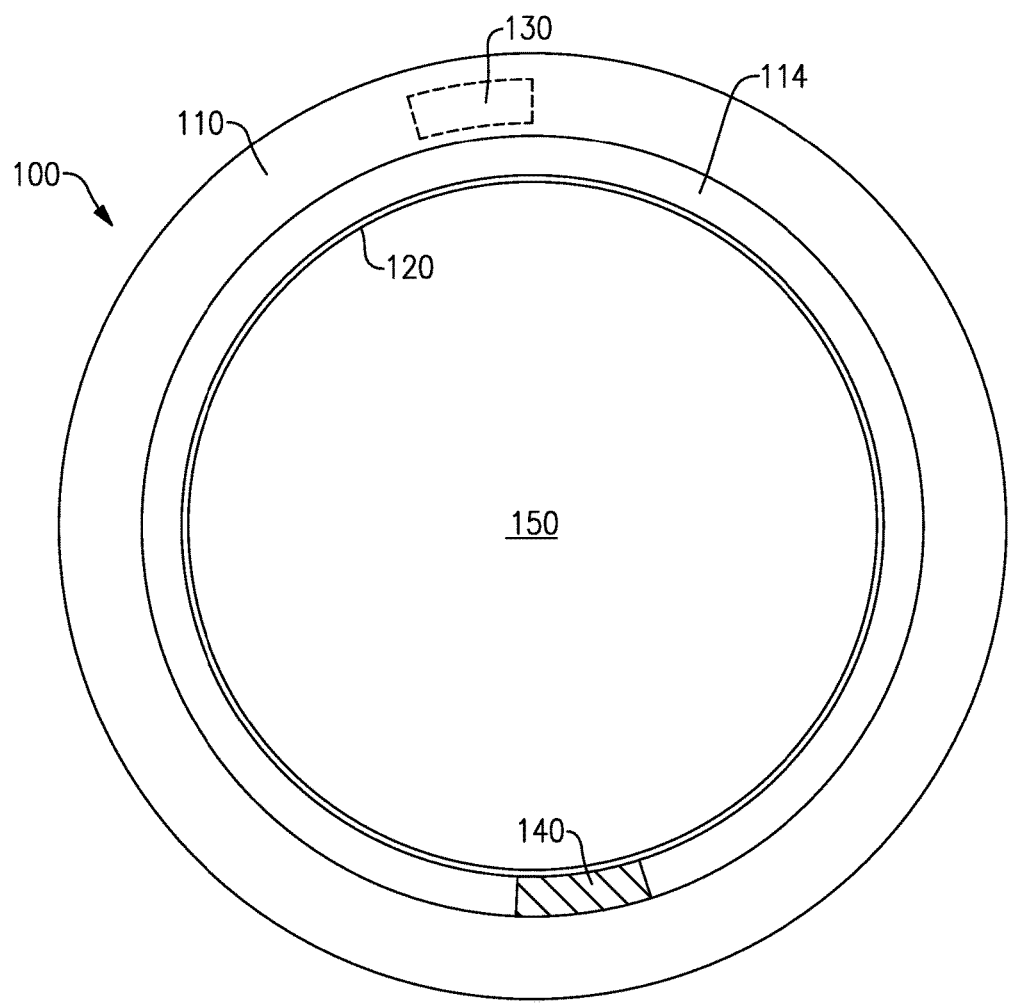
FIG. 2A schematically illustrates a simplified fore view of the balanced rotating component of FIG. 2.

FIG. 2 illustrates a side cross sectional view of a rotating component 100. FIG. 2A illustrates a simplified fore view of the rotating component 100. The simplified fore view omits certain elements of the component for explanatory purposes. In the example illustrated in FIGS. 2 and 2A, the rotating component 100 includes a rotor blade 111, connected to a rotor disc 112. The rotating component 100 further includes cover plates 114 connected to each axial side of the rotating component 100. In the simplified fore view of FIG. 2A the fore coverplate 114 is omitted and the aft coverplate 114 is partially obscured. In alternate examples, the rotating component 100 only includes a cover plate 114 on one axial side. The cover plates 114 are retained in position via a retaining ring 120 that interfaces with the disc 112 and the cover plate 114.

In the illustrated example of FIGS. 2 and 2A, the rotor blade 111 includes an overweight region 130. The overweight region causes the weight distribution of the rotor to be circumferentially uneven, and will cause vibrations within the engine without a suitable counterweight.

The retaining ring 120 is constructed using an additive manufacturing process. Additive manufacturing techniques are colloquially referred to as "3D printing", and allow an individual component to be created by sequentially applying individual layers of a material to a substrate, with each layer having a specific two dimensional profile. The buildup of the sequentially applied layers creates a three dimensional structure based on the two dimensional profiles.

In the illustrated example of FIG. 2, the particulars of the imbalance (i.e., the overweight region 130) of any given rotor 110 can be determined prior to the manufacturing of the retaining ring 120, and the retaining ring 120 is correspondingly additively manufactured with the inclusion of the counterweight region 140, thereby creating a custom balanced rotating component for any given application.

Utilizing the additive manufacturing technique to create the retaining ring 120 of the rotating component 100, allows the counterweight region 140 to be created integrally to an existing part in the rotating component 100, and an additional balance ring, or separate counterweight component is not required in the example of FIG. 2.

In the illustrated example of FIG. 2, the majority of the retaining ring 120 is manufactured from a suitable additive manufacturing material with a relatively low density. The counterweight region 140, however, is created from a second material, or compilation of materials with a relatively high density. The two materials can be integrally created with a single overall profile resulting in the illustrated retaining ring 120. The utilization of two distinct materials allows the counterweight region 140 to be denser than the remainder of the retaining ring 120, thereby causing the counterweight region 140 to be heavier and countering the overweight region 130. By constructing the retaining ring 120 in this manner, a preset dimensional profile of the retaining ring 120 can be utilized, while still incorporating the counterweight region 140. In this example, the weight profile of the counterweight region 140 is determined by the ratio of the denser material to the lighter material throughout the counterweight region 140.

In alternate examples, the counterweight region 140 and the remainder of the retaining ring 120 are constructed of the same material, and the counterweight region 140 has physical dimensions that vary from the remainder of the retaining ring 120. The variance in physical dimension increases the weight in the counterweight region 140 and achieves the counterweighting function.

Furthermore, while the counterweight region 140 is described as being incorporated in the retaining ring 120, one of skill in the art having the benefit of this disclosure would recognize that any part of the rotating component 100 suitable for additive manufacturing could include the counterweight region 140, and provide the same benefit.

Figure 3:
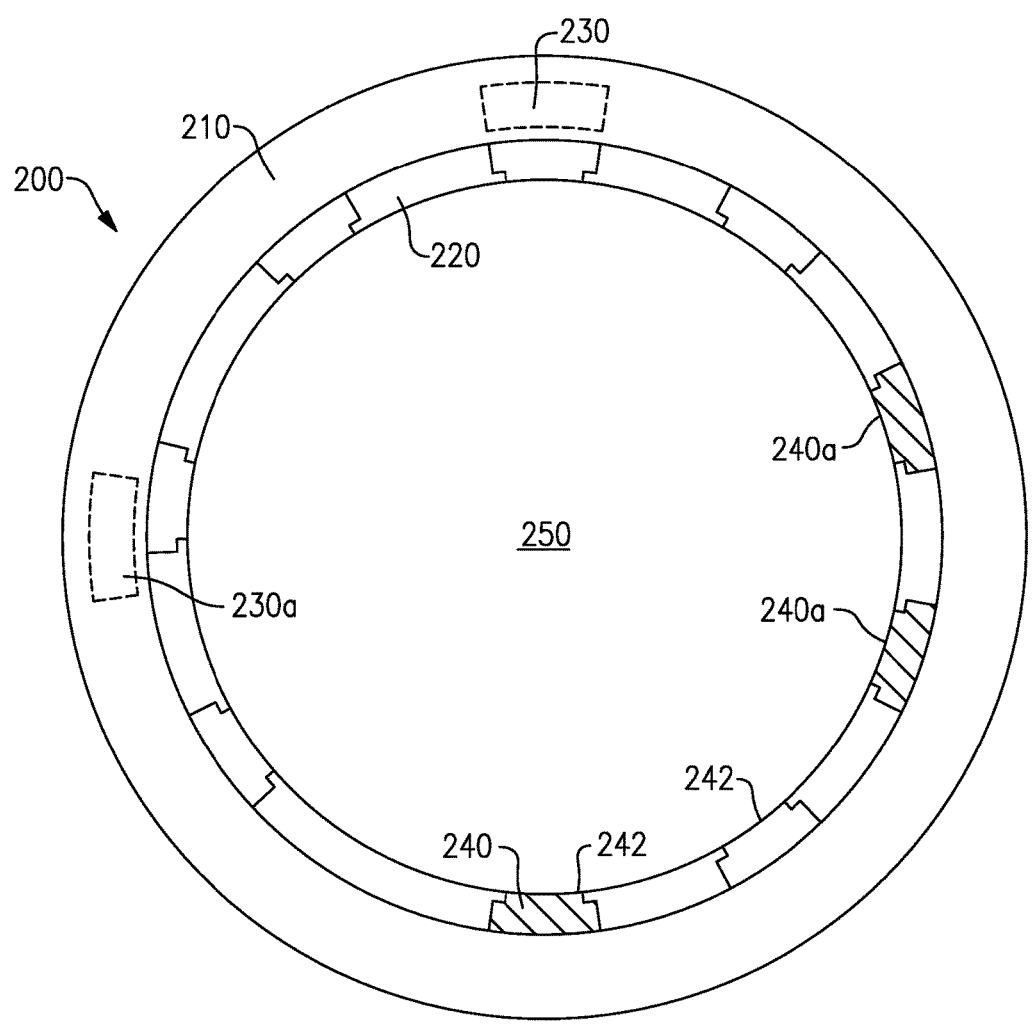
FIG. 3 schematically illustrates a balanced rotating component including an additively manufactured secondary component.

FIG. 3 illustrates an alternate example rotating component 200, including a distinct counterweight component 240 that is slotted into a receiving slot 242 located in a root portion of the rotating component 200 to create a balanced rotating component 200. As with the example of FIG. 2, the base rotating component 200 includes a rotor portion 210 for mounting rotor blades and a retaining ring 220 for connecting to shaft 250. The retaining ring 220 and the rotor portion 210 of the rotating component 200 are constructed using standard rotor creation methods. The counterweight slots 242 are distributed circumferentially about the rotating components 200, thereby ensuring that the rotating component 200 is circumferentially balanced, with the exception of the overweight regions 230, 230a. In some alternate examples, the counterweight slots 242 are positioned in other portions of the rotating component 200 and not in the retaining ring 220. In the alternate examples, the counterweight slots 242 are also distributed evenly circumferentially.

During manufacturing, the rotating component 200 is tested to determine if any overweight regions 230, 230a exist, and where any overweight regions 230, 230a are located. The particular weight profile of any overweight regions 230 is also determined at this stage. The weight profile of the overweight region 230 is the circumferential distribution of the weight in the overweight region, and determines the weight profile needed in a counterweight 240 designed to counter the overweight region 230.

The illustrated example of FIG. 3 includes two overweight regions 230, 230a. The first overweight region 230 is approximately centered over a counterweight slot 242 and has another counterweight slot 242 positioned 180 degrees offset from the overweight region 230. For the first overweight region 230, a single counterweight 240 can be designed to balance the overweight region 230. The single counterweight 240 is received and retained in the counterweight slot 242 that is 180 degrees offset from the first overweight region 130.

The second overweight region 230a does not have a counterweight slot 242 approximately 180 degrees offset from the overweight region 230a. As such, two counterweight slots 242 receive corresponding counterweights 240a designed to cooperatively counter the overweight region 230. The weight profiles of the two counterweights 242a are designed to cooperatively balance the overweight region 230a. Once the weight profiles of the overweight regions 230 are determined, the corresponding counterweight 240 (or multiple corresponding counterweights 240a), for each of the overweight regions 230, 230a is designed according to known balancing techniques and printed using the additive manufacturing technique as necessary.

In one example, the remaining counterweight slots 242 that do not receive and retain counterweights 240, 240a are filled in with low mass "blank" counterweights that minimally affect the weight distribution of the rotating component 200. In alternate examples, the counterweight slots 242 that do not receive and retain counterweights 240, 240a are left empty.

Figure 4:
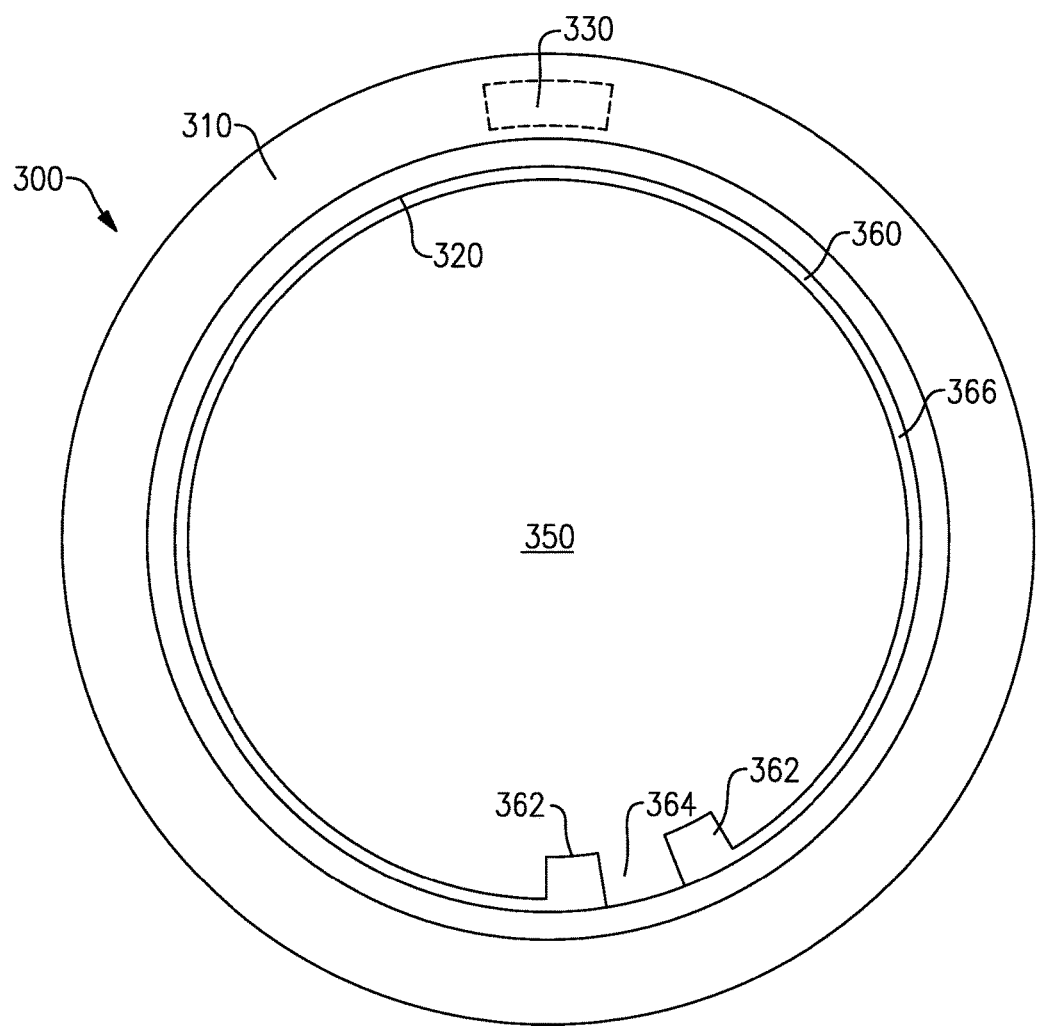
FIG. 4 schematically illustrates a balanced rotating component including a additively manufactured balance ring.

FIG. 4 illustrates another example embodiment of a rotating component 300, where an additively manufactured counterweight 360 is created as an entirely separate component and received within the rotating component 300 or otherwise connected to the rotating component 300. As with the previous examples, the rotating component 300 is connected to a shaft 350 and includes a rotor portion 310 for mounting rotor blades and a retaining ring 320 for connecting the rotor portion 310 to the shaft 350.

Similar to the example illustrated in FIG. 3, the rotating component 300 is manufactured according to known techniques and is tested to determine the location of any overweight regions 330. Once the overweight regions 330 are determined, a counterweight component 360, such as a balance ring, can be additively manufactured to the exact counterweight profile required to balance the rotating component 300.

The example counterweight component 360 is a balance ring including a thin ring shaped body portion 366 and a split opening 364 for mounting the balance ring to the rotating component 200. The counterweight regions 362 are built up via additive manufacturing and are designed in a manner to counteract the unbalanced region 330. In alternate examples, the additively manufactured balancing component 360 can be a rotor cover, or any other rotor component that is attached to the rotating component 300 in a standard turbine engine configuration and is maintained in a static position relative to the rotating component 300.

While the examples illustrated in FIGS. 2-4, and described above, are directed toward a rotating component for use in a gas turbine engine, it is further understood that the same techniques can be applied to a rotating component for any gas powered turbine, including a land based turbine, and are not limited to turbine engines for aircraft.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotating component for a turbine engine comprising:
a rotor portion protruding radially outward, relative to an axis of rotation of a gas turbine engine in which the rotor portion is configured to be installed;
at least one overweight region is located in said rotor portion, wherein the overweight region causes a circumferential imbalance;
at least one additively manufactured counterweight region positioned relative to said at least one overweight region such that said rotating component is circumferentially balanced, said at least one additively manufactured counterweight region being comprised of a first material and a second material, wherein the first material is denser than the second material;
wherein a weight profile of the at least one additively manufactured counterweight region is determined by a distribution of the first material and the second material within the counterweight region and is configured to offset the circumferential imbalance; and
wherein the distribution of the first material and the second material within the counterweight region is determined post manufacture of at least a portion of the rotating component.

2. The rotating component of claim 1, further comprising a retaining ring for connecting a rotor coverplate to said rotating component, wherein the at least one additively manufactured counterweight region is a region of said retaining ring.

3. The rotating component of claim 2, wherein said at least one additively manufactured counterweight region is integral to said retaining ring.

4. The rotating component of claim 2, wherein said retaining ring is entirely additively manufactured.

5. The rotating component of claim 2, wherein said at least one additively manufactured counterweight region is a portion of said retaining ring, is less than 100% of said retaining ring.

6. The rotating component of claim 1, wherein said at least one additively manufactured counterweight region is manufactured distinct from a retaining ring and installed in said retaining ring such that said at least one additively manufactured counterweight region is static relative to said rotor portion.

7. The rotating component of claim 1, wherein the at least one additively manufactured counterweight region is included in a retaining ring of said rotating component and said rotating component lacks an additional balance ring.

8. The rotating component of claim 1, wherein a circumferential weight profile of said rotating component is at least partially dependent on a ratio of said amount of said second material used to an amount of the first material used.

9. The rotating component of claim 8, wherein said rotating component has a predetermined dimensional profile regardless of said circumferential weight profile of said rotating component.

10. A method for creating a rotating component for a turbine comprising the steps of:
manufacturing at least a first portion of said rotating component;
testing said first portion of said rotating component to determine any circumferential imbalance; and additively manufacturing at least a second portion of said rotating component including a counterweight region in said second portion of said rotating component, thereby circumferentially balancing said rotating component, wherein the counterweight region includes a weight profile configured to offset the circumferential imbalance, and additively manufacturing said counterweight region of said second portion at least partially of a first material and additively manufacturing a remainder of said second portion from a second material, said first material being denser than said second material.

11. The method of claim 10, wherein said step of additively manufacturing at least the second portion of said rotating component including a counterweight region in said second portion of said rotating component, thereby circumferentially balancing said rotating component further comprises additively manufacturing said second portion of said rotating component integral to said first portion of said rotating component.

12. The method of claim 10, wherein said second portion of said rotating component is fixedly attached to said first portion of said rotating component and is a distinct component from a remainder of said rotating component.

13. The method of claim 10, further comprising attaching said second portion of said rotating component to said first portion of said rotating component such that said second portion is maintained in a static position relative to said rotating component.

14. A gas turbine engine comprising:
a compressor section;
a combustor section fluidly connected to said compressor section;
a turbine section fluidly connected to said combustor section;
at least one rotating component having a retaining ring that at least partially comprises an additively manufactured portion, said retaining ring having a circumferential weight profile operable to counterbalance an unbalanced portion of said at least one rotating component; and
said retaining ring including a counterweight region positioned relative to said unbalanced portion such that said at least one rotating component is circumferentially balanced, the counterweight region being comprised of a first material and a second material,
wherein the first material is denser than the second material; wherein a weight profile of the counterweight region is dependent on a distribution of the first material and the second material within the counterweight region and is configured to offset the circumferential imbalance; and
wherein the distribution of the first material and the second material within the counterweight region is determined post manufacture of the unbalanced portion of said at least one rotating component.

15. The gas turbine engine of claim 14, wherein said at least one rotating component is a rotor disposed in one of said compressor section and said turbine section.

16. The gas turbine engine of claim 14, wherein said at least one rotating component includes a plurality of additively manufactured portions.

17. The gas turbine engine of claim 14, wherein said additively manufactured portion of said retaining ring is a distinct component from a remainder of said retaining ring.

* * * * *